(12) United States Patent
Kasama et al.

(10) Patent No.: US 8,000,593 B2
(45) Date of Patent: Aug. 16, 2011

(54) DISTANCE MEASURING DEVICE AND DISTANCE MEASURING METHOD

(75) Inventors: Koichiro Kasama, Kawasaki (JP); Yumiko Ozawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 12/558,946

(22) Filed: Sep. 14, 2009

(65) Prior Publication Data
US 2010/0074609 A1    Mar. 25, 2010

(30) Foreign Application Priority Data
Sep. 24, 2008   (JP) .................................. 2008-244185

(51) Int. Cl.
*G03B 13/30*    (2006.01)

(52) U.S. Cl. .................................. 396/147; 348/333.02
(58) Field of Classification Search .................. 396/147, 396/121; 345/84, 656; 348/208.2, 333.01, 348/333.02; 700/302
See application file for complete search history.

(56) References Cited

U.S. PATENT DOCUMENTS
| | | | |
|---|---|---|---|
| 2005/0052558 A1 | 3/2005 | Yamazaki et al. | |
| 2006/0187333 A1 | 8/2006 | Kobayashi et al. | |
| 2010/0174421 A1* | 7/2010 | Tsai et al. | 700/302 |
| 2011/0018904 A1* | 1/2011 | Tang | 345/656 |

FOREIGN PATENT DOCUMENTS
| | | |
|---|---|---|
| JP | 2005-84951 | 3/2005 |
| JP | 2006-234545 | 9/2006 |
| JP | 2007-64890 | 3/2007 |

* cited by examiner

*Primary Examiner* — Clayton E Laballe
*Assistant Examiner* — Autumn Parker
(74) *Attorney, Agent, or Firm* — Staas & Halsey LLP

(57) ABSTRACT

A distance measuring device includes a display processor that acquires an image which includes a distance measuring object from a camera, and generates display information indicating the image, an acceleration sensor that is provided with a device housing having the display processor and outputs a gravity acceleration component corresponding to an inclination angle of the device housing, and a distance measuring processor that calculates an inclination angle from the gravity acceleration component that is obtained from the acceleration sensor in a state that an image indicating the measuring object is complemented in the display information generated by the display processor.

13 Claims, 14 Drawing Sheets

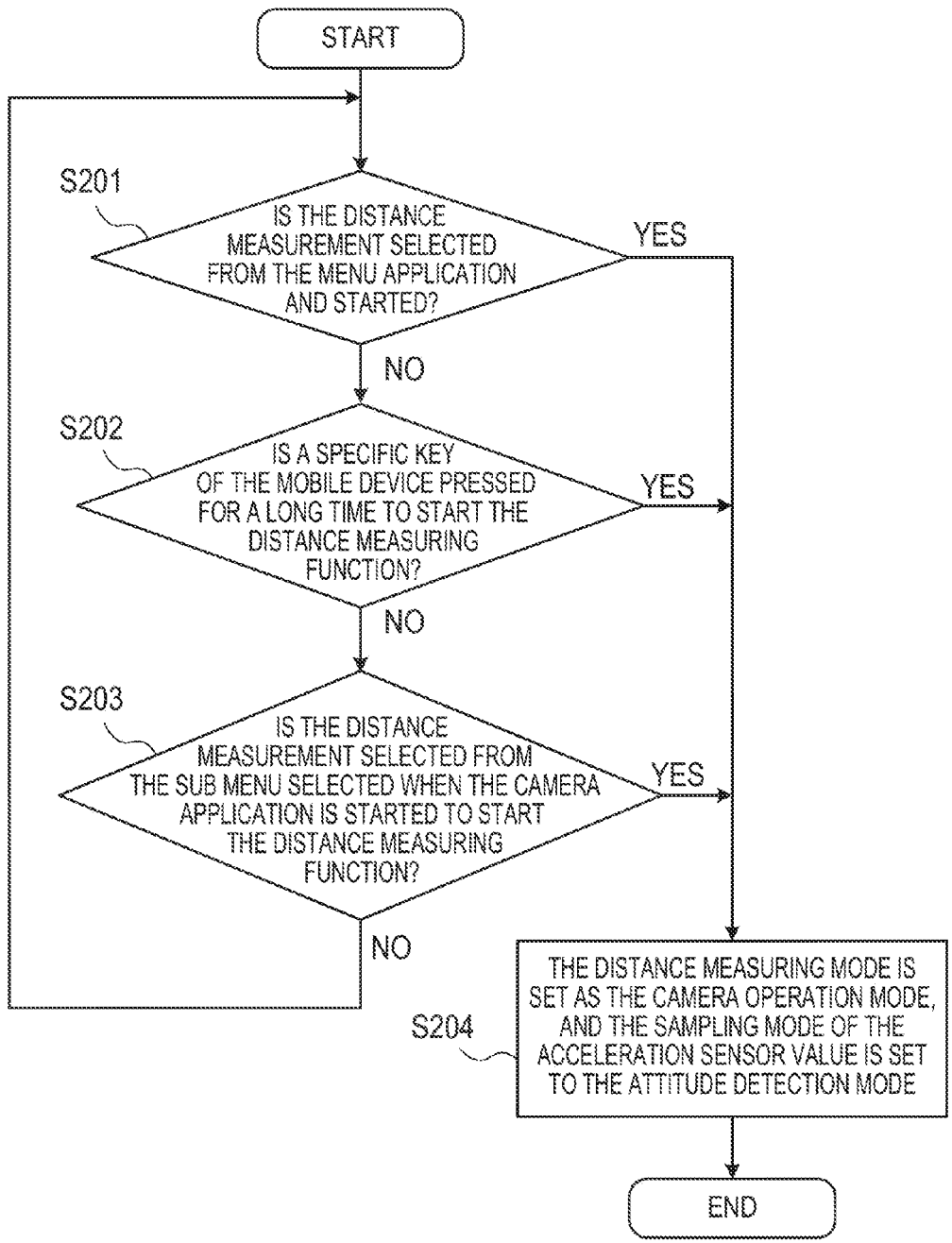

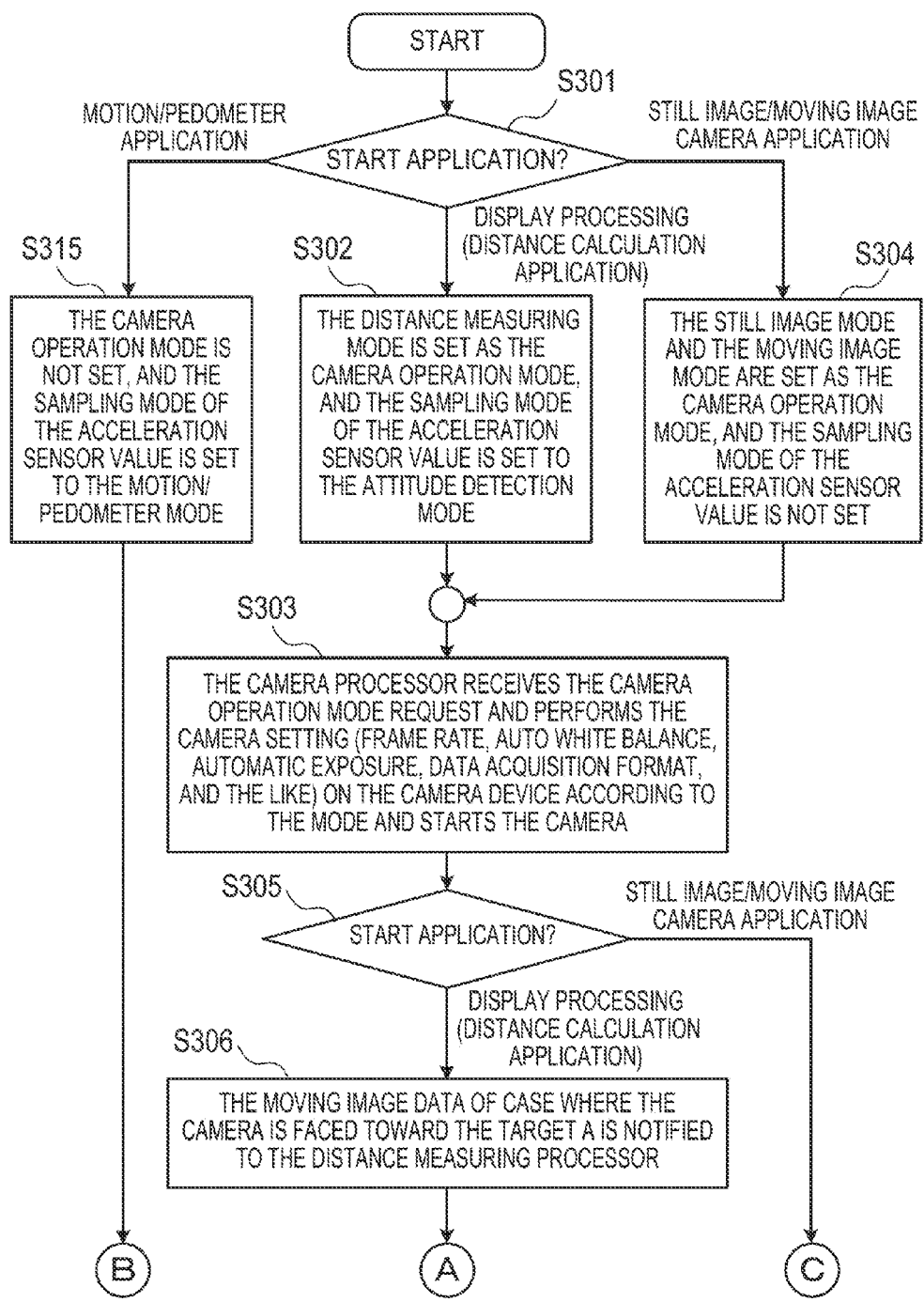

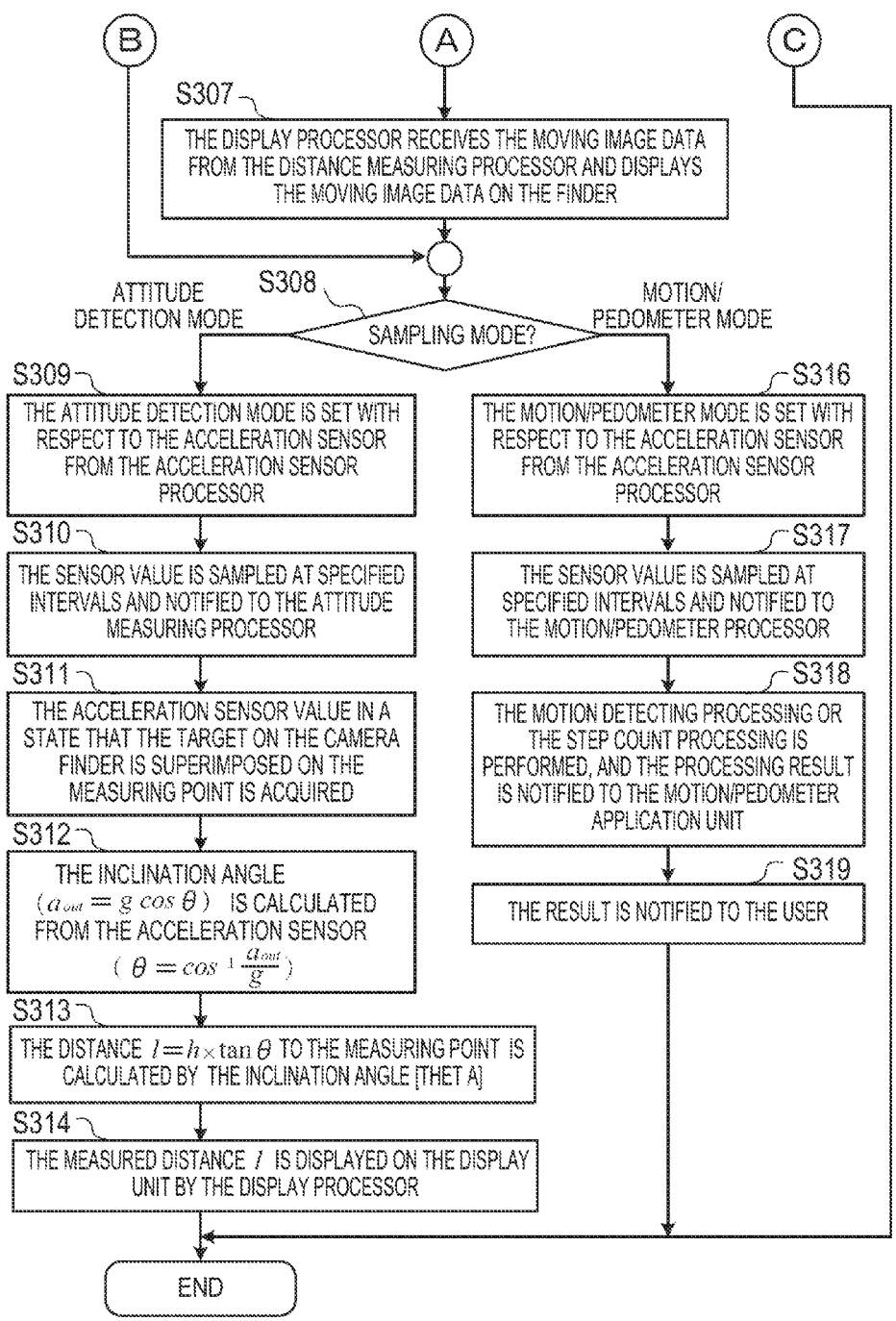

12# DISTANCE MEASURING DEVICE AND DISTANCE MEASURING METHOD

CROSS-REFERENCE TO RELATED APPLICATIONS

This application is based upon and claims the benefit of priority of the prior Japanese Patent Application No. 2008-244185, filed on Sep. 24, 2008, the entire contents of which are incorporated herein by reference.

BACKGROUND

1. Field

The present invention relates to distance measurement using a mobile device such as a mobile phone. The present invention, for example, relates to a distance measuring device and a distance measuring method performing distance measurement using gravity acceleration information and image information.

2. Description of the Related Art

In the conventional technique, distance measurement is performed by a unit, for example, which sends strong infrared rays to a measuring object and receives the reflected light. However, the unit requires an infrared ray generating unit, a light receiving unit, and the like, and there is no unit for measuring a distance with a simple configuration.

As a configuration for measuring a size or the like of an object by using an image by a camera or the like, Japanese Laid-open Patent Publication No. 2006-234545 discloses an imaging unit that images an object by facing the object and forming an image of the object. The display unit displays image data that is imaged by the imaging unit. A distance measuring unit measures a distance to the object that is imaged by the imaging unit. An index display unit displays an index by superimposing the image data on the display unit. An inclination angle measuring unit measures an inclination angle when the imaging unit is inclined in a way that the index displayed by the index display unit corresponds to a desired measuring object part, and an actual size calculation unit calculates an actual size of the object based on a measurement result of the distance measuring unit and a measurement result of the inclination angle measuring unit.

As for calculation of a distance using an image by a CCD camera, Japanese Laid-open Patent Publication No. 2007-064890 discloses that a CCD camera 1E, as a home edge detecting sensor, is used to photograph a slit image E of reflection slit light acquired by irradiating a platform edge P region with laser slit light. A data calculation processor 5 performs a specified calculation based on position information and the like of a laser light origin 1A and the CCD camera 1E on a vehicle body 101 that is specified in advance, resulting in a calculation of a distance A in a horizontal position between a side surface of the vehicle body 101 and the platform edge P of a platform 200.

As for acquiring image information by considering the distance and inclination between a paper surface or the like and an imaging unit, Japanese Laid-open Patent Publication No 2005-084951 discloses a configuration in which an imaging unit outputs image information, a display unit displays identification information included in the image information that is output by the image unit, a recognition unit recognizes the identification information included in the image information output by the imaging unit, and a control unit controls in a way that all or part of the display position or the angle of the image information is converted according to the position of the display unit or the imaging unit when the recognition unit recognizes the identification information.

When the above-described distance measuring function is newly mounted on a mobile device such as a mobile phone, the size of the mobile device has to be increased. Mounting such a function on a miniaturized mobile device is difficult. Even though calculation ability of the mobile device has been improved, a load of control processing of the distance measuring function is extremely heavy. Therefore, mounting the distance measuring function on a mobile device is difficult.

Japanese Laid-open Patent Publication No. 2006-234545, 2007-064890, and 2005-084951 have no disclosure and suggestion of such request and problem. There is no disclosure and suggestion of configurations and the like to solve the request and problem.

SUMMARY

According to an aspect of the invention, a distance measuring device includes a display processor that acquires an image which includes a distance measuring object from a camera, and generates display information indicating the image, an acceleration sensor that is provided with a device housing having the display processor and outputs a gravity acceleration component corresponding to an inclination angle of the device housing, and a distance measuring processor that calculates an inclination angle from the gravity acceleration component that is obtained from the acceleration sensor in a state that an image indicating the measuring object is complemented in the display information generated by the display processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 12 is a flowchart illustrating start determination processing of a distance measuring function, and FIG. 13 is a flowchart related to application start processing of a mobile device.

FIG. 14 is a flowchart related to application start processing of a mobile device.

DESCRIPTION OF EMBODIMENTS

Figure 1:
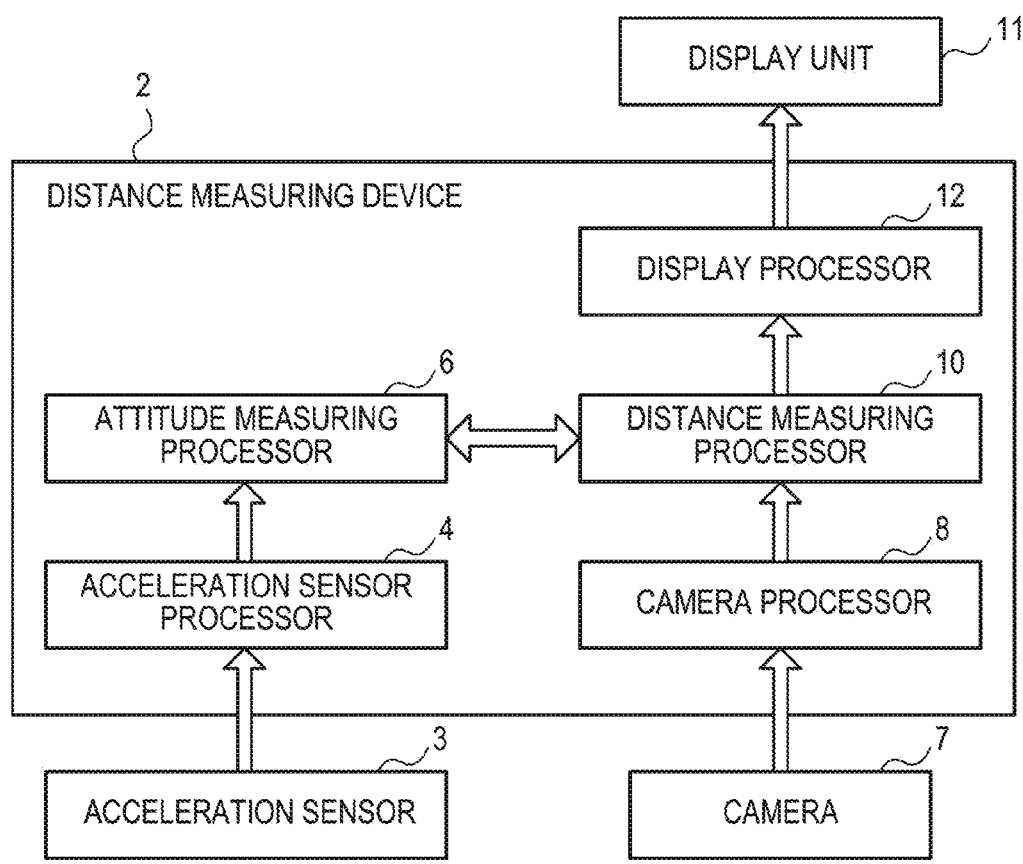
FIG. 1 is a diagram illustrating a configuration of a functional unit of a distance measuring device according to a first embodiment.

Reference may now be made in detail to embodiments of the present invention, examples of which are illustrated in the accompanying drawings, wherein like reference numerals refer to like elements throughout.

First Embodiment

With reference to FIG. 1, a configuration of a distance measuring function according to the first embodiment will be described. FIG. 1 is a diagram illustrating a configuration of a functional unit of a distance measuring device according to the first embodiment. The content illustrated in FIG. 1 is an example, but not limited to this example.

A distance measuring device 2 performs distance measurement by using a measuring angle with respect to a measuring object, gravity acceleration, and a measuring height and the like according to the measuring angle. The distance measuring device 2 includes, as illustrated in FIG. 1, an acceleration sensor 3, an acceleration sensor processor 4, an attitude measuring processor 6, a camera 7, a camera processor 8, a distance measuring processor 10, a display unit 11, and a display processor 12.

The acceleration sensor 3, which measures acceleration in a set direction, is an acceleration measuring unit capable of measuring gravity acceleration on the ground in a stationary state.

The acceleration sensor processor 4, which is configured to perform data processing and the like of the measured acceleration, samples a measured value at specified intervals from the acceleration sensor 3 and transmits the measured value to the attitude measuring processor 6.

The attitude measuring processor 6 is a processor that performs calculation and the like of an inclination angle θ indicating a measuring angle of the distance measuring device 2, that is, an angle formed by a mobile device 14 (FIG. 2) and the ground surface. For example, when the distance measuring device 2 is faced toward the ground surface (zero degrees), the attitude measuring processor 6 acquires a value of gravity acceleration g from the acceleration sensor processor 4 in a stationary state. When the distance measuring device 2 is faced toward the measuring object, the attitude measuring processor 6 acquires, from the acceleration sensor processor 4, the value of acceleration in the stationary state. As described below, the attitude measuring processor 6 calculates the inclination angle θ of the distance measuring device 2 by using the value of the acceleration.

The camera 7, which is a camera module of a digital camera and the like mounted on a mobile phone as an example of the mobile device 14 (FIG. 2), acquires image information. In this case, the camera module may acquire moving images. For example, a digital camera, a digital video camera, or the like may be used.

The camera processor 8 acquires, from the camera 7, data of a moving image that includes the measuring object, based on setting of 15 frame per second (FPS), for example, and transmits the data to the distance measuring processor 10.

In the distance measuring processing, the distance measuring processor 10 transmits the moving image data transmitted from the camera processor 8 to the display processor 12 to determine an object of distance measurement. If the distance measuring device 2 is faced toward the measuring object, the distance measuring processor 10 acquires the moving image data from the camera processor 8 and the calculated value of the inclination angle θ from the attitude measuring processor 6 to calculate a distance I to the measuring object.

The display unit 11 includes, for example, a Liquid Crystal Display (LCD) display unit. The display unit 11 displays the image information acquired by the camera 7 on a finder, and indicates the object of distance measurement.

The display processor 12 generates display information of the moving image transmitted from the camera processor 8 and displays the display information on a finder of the display unit 11. A measuring point indicating the measuring object is also displayed on the finder. Furthermore, the display processor 12 is configured to display a result of the measurement distance received from the distance measuring processor 10.

Figure 2:
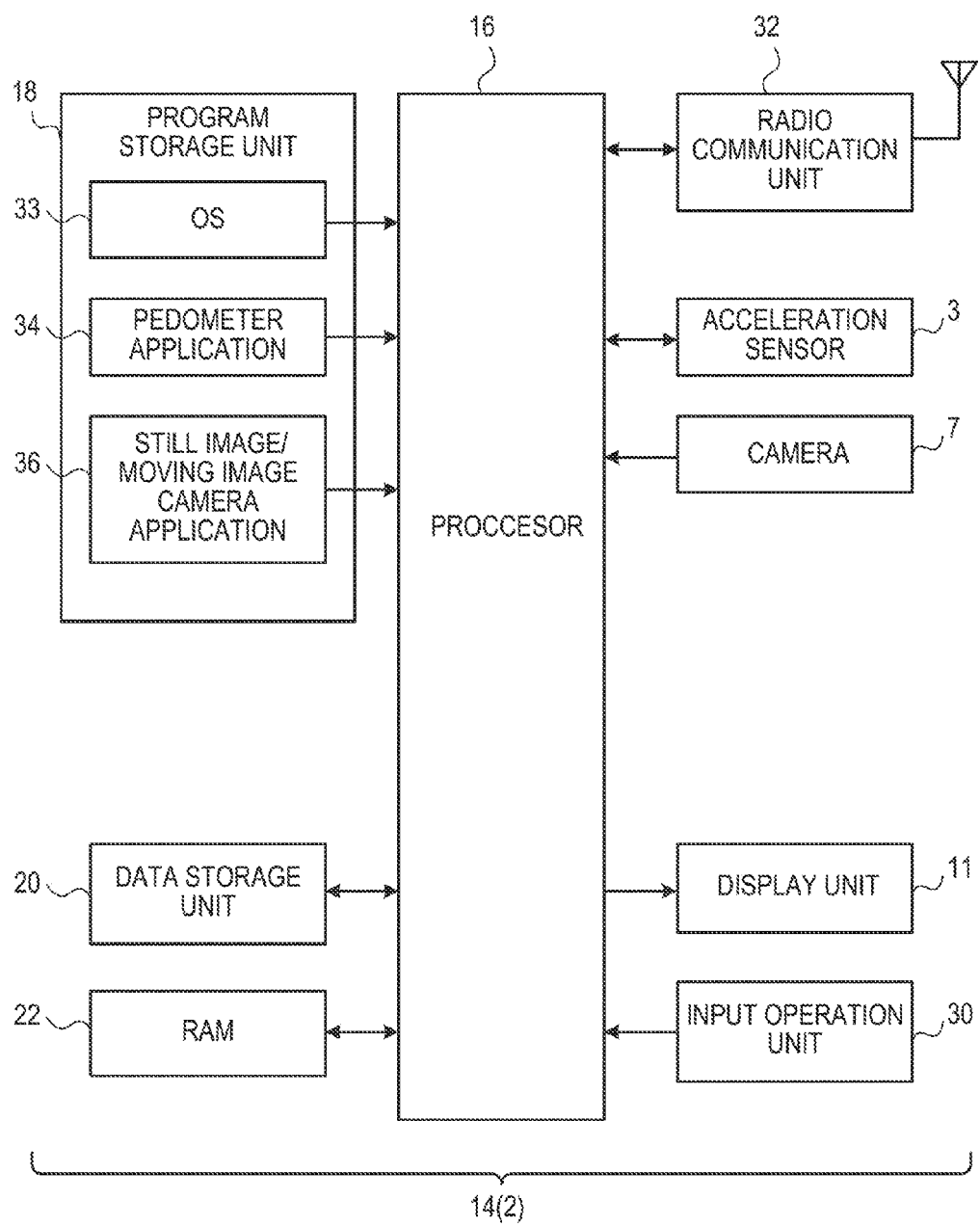
FIG. 2 is a diagram illustrating a hardware configuration of a mobile device having a distance measuring device.
Figure 3:
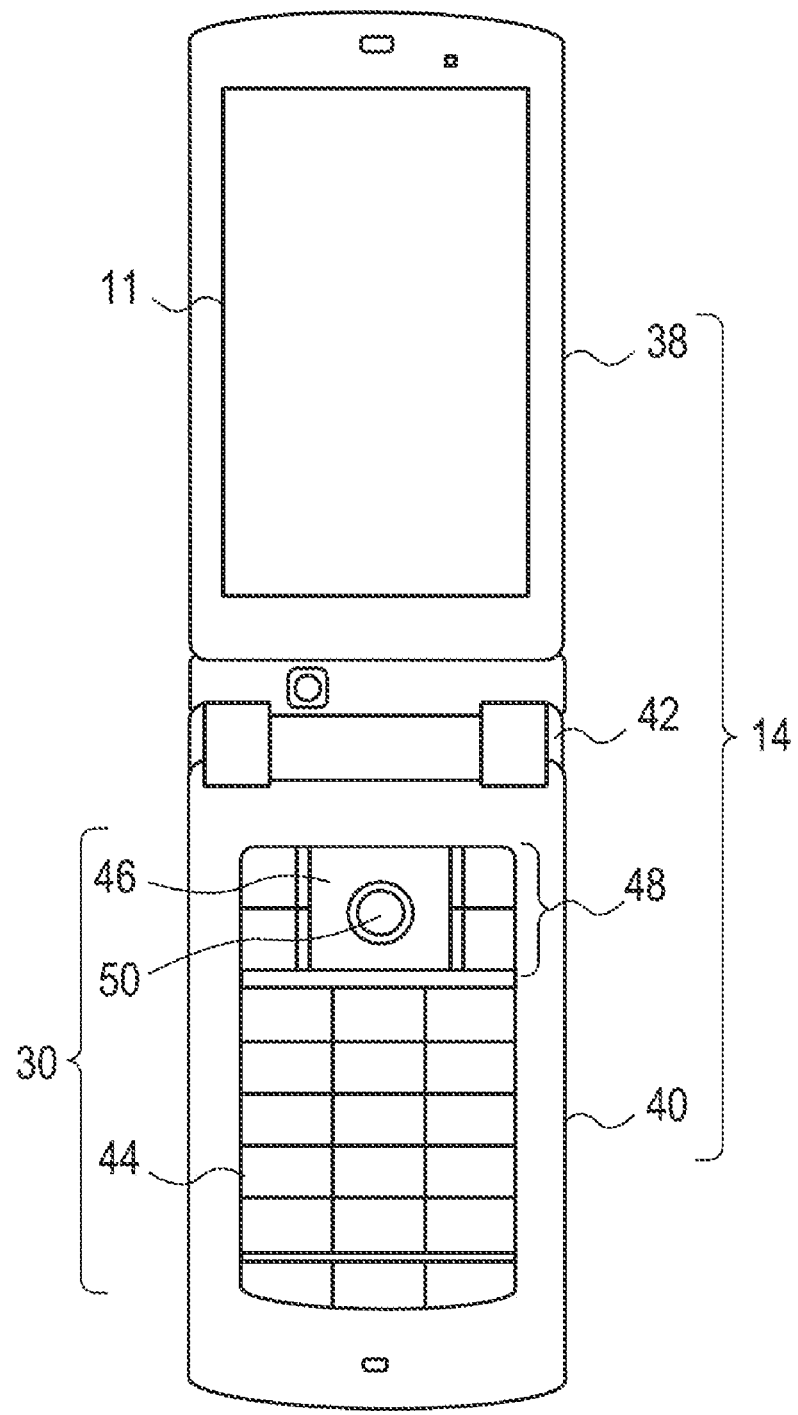
FIG. 3 is a diagram illustrating an external configuration of a mobile device in an open state.
Figure 4:
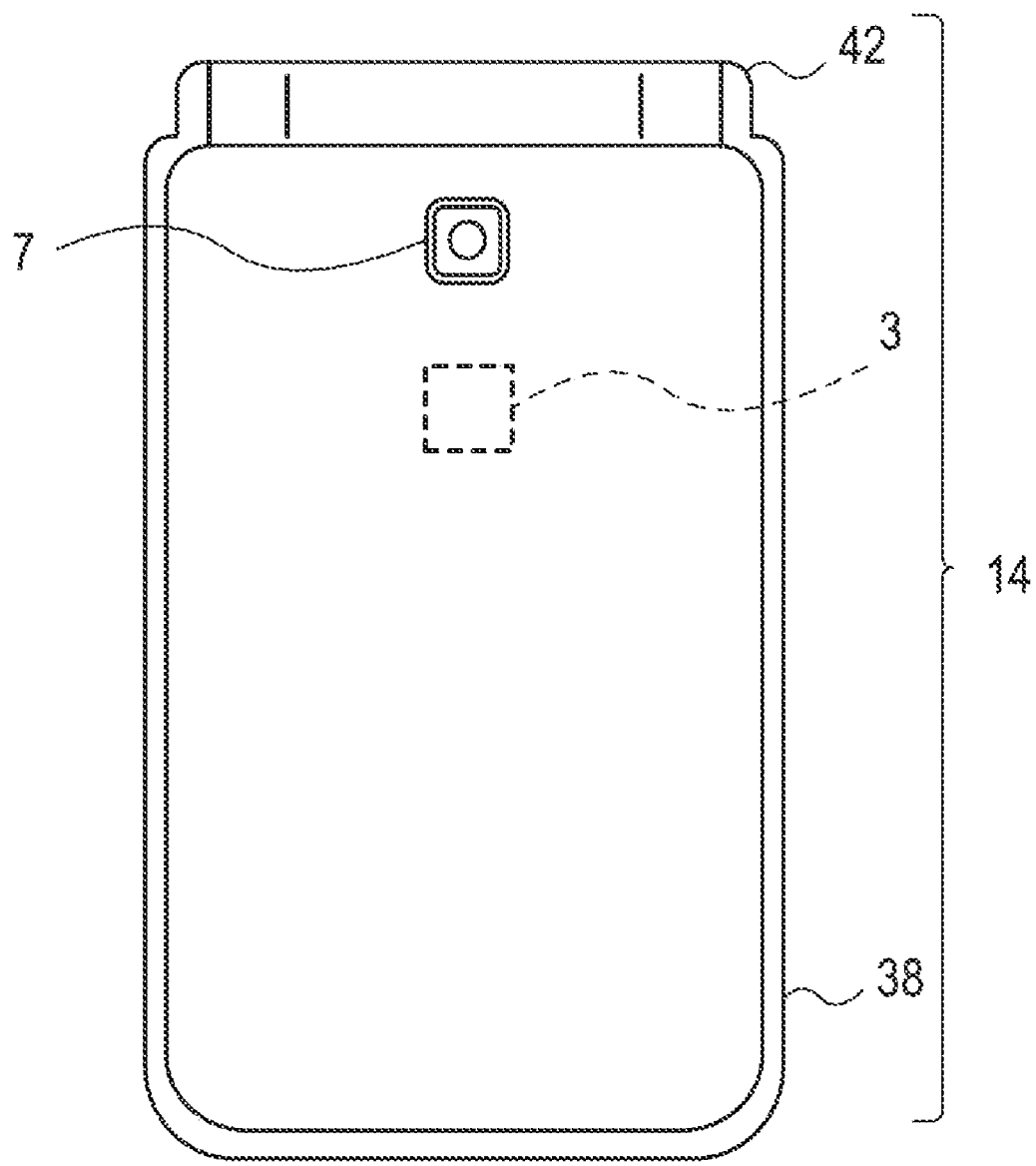
FIG. 4 is a diagram illustrating an external configuration of a mobile device in a closed state.

The configuration of the mobile device 14 will be described with reference to FIG. 2, FIG. 3, and FIG. 4. FIG. 2 is a diagram illustrating a hardware configuration of the mobile device 14 having a distance measuring device. FIG. 3 is a diagram illustrating an external configuration of the mobile device 14 in an open state. FIG. 4 is a diagram illustrating an external configuration of the mobile device 14 in a closed state. The configurations illustrated in FIG. 2, FIG. 3, and FIG. 4 are examples, but not limited to these examples.

The mobile device 14 is an example of the distance measuring device 2 that has the distance measuring method and the distance measuring program. The mobile device 14 performs the distance measurement by using the angle θ with respect to the measuring object viewed from the mobile device 14. As well as the above-described acceleration sensor 3, camera 7, and display 11, the mobile device 14 includes, for example, a processor 16, a program storage unit 18, a data storage unit 20, a Random Access Memory (RAM) 22, an input operation unit 30, a radio communication unit 32, and the like.

The processor 16 is a calculator that performs control processing and the like of the mobile device 14 and calculates a distance measuring program and the like. The program storage unit 18 includes a flash memory, for example, as a recording medium and stores various programs for performing distance measuring processing, operation control programs and the like of the acceleration sensor 3, the camera 7, and the display 11, and the like as well as the above-described OS 33. For example, the program storage unit 18 stores a pedometer application 34, a still image/moving image camera application 36, and the like as a program related to another function of the mobile device 14, as well as an attitude measurement program for performing calculating processing of the inclination angle θ performed in the attitude measuring processor 6 (FIG. 1) and a calculation processing program performed in the distance measuring processor 10 (FIG. 1).

The RAM 22 is a work area.

The input operation unit 30 is composed of, for example, a keyboard, a cursor key, an execution key, and the like. The input operation unit 30 is used to press a key to start a distance measuring mode.

The radio communication unit 32 is a communication unit that performs communication by the mobile device 14 with an external device and the like and includes a communication function and a data transmission reception function.

As illustrated in FIG. 3, the mobile device 14 has a configuration in which a housing unit 38 and a housing unit 40 are linked together to be collapsible by a hinge unit 42. The input operation unit 30 is allocated in the housing unit 40 side. The display 11 is allocated in the housing unit 38 side. The input operation unit 30 includes a plurality of character keys 44, a direction key 46, selection keys 48, and an execution key 50. The character keys 44 are also served as numeral keys used for dial input. The execution key 50 may be operated as an execution key to perform measuring processing by the acceleration sensor 3 in the distance measuring processing and may also be operated as an execution key to capture the measuring object by the camera 7 and perform the distance calculation processing. A shortcut function for starting the distance measuring program may be set to any key of the input operation unit 30.

As illustrated in FIG. 4, the housing unit 38 of the mobile device 14 includes the camera 7 having an image acquisition unit and includes the acceleration sensor 3. As described below, in the distance measuring processing, when the camera 7 is faced toward the measuring object, the inclination angle of the mobile device 14 is determined. Thus, the gravity acceleration according to the inclination angle is measured. That is, the direction in which the camera 7 captures an image is corresponded to the direction in which the acceleration sensor 3 measures the acceleration.

Figure 5:
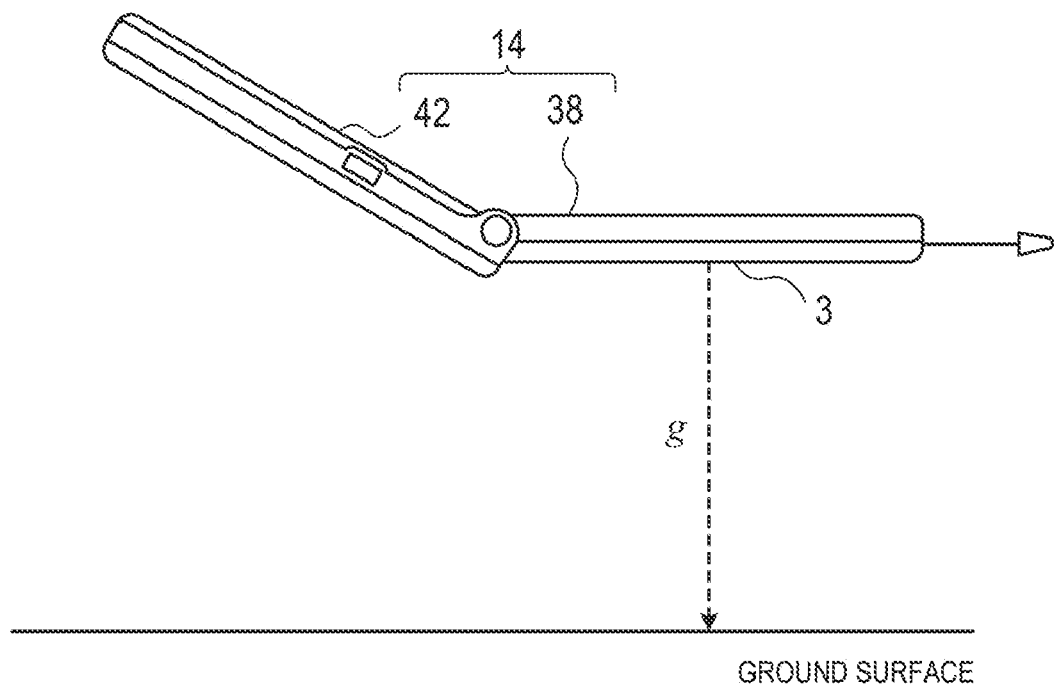
FIG. 5 is a diagram illustrating acceleration measurement by an acceleration sensor in case where an inclination angle is zero degrees.
Figure 6:
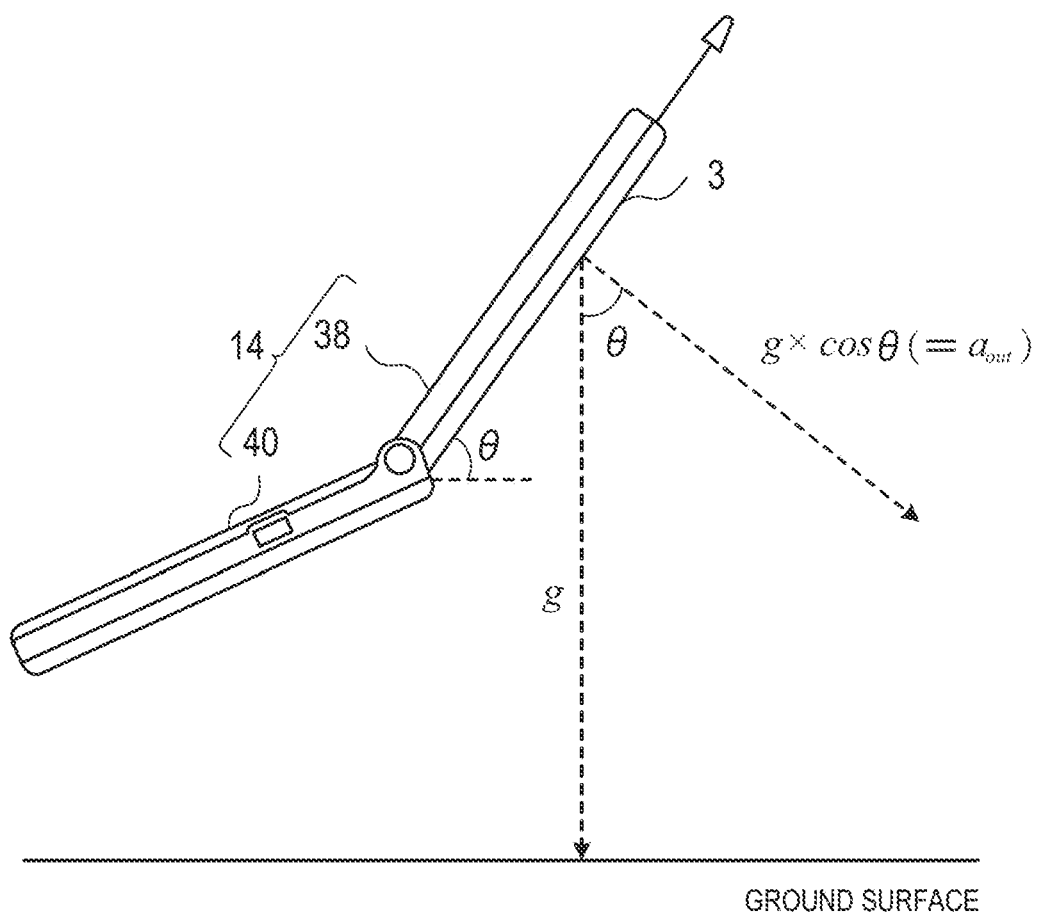
FIG. 6 is a diagram illustrating acceleration measurement in direction of inclination angle θ.
Figure 7:
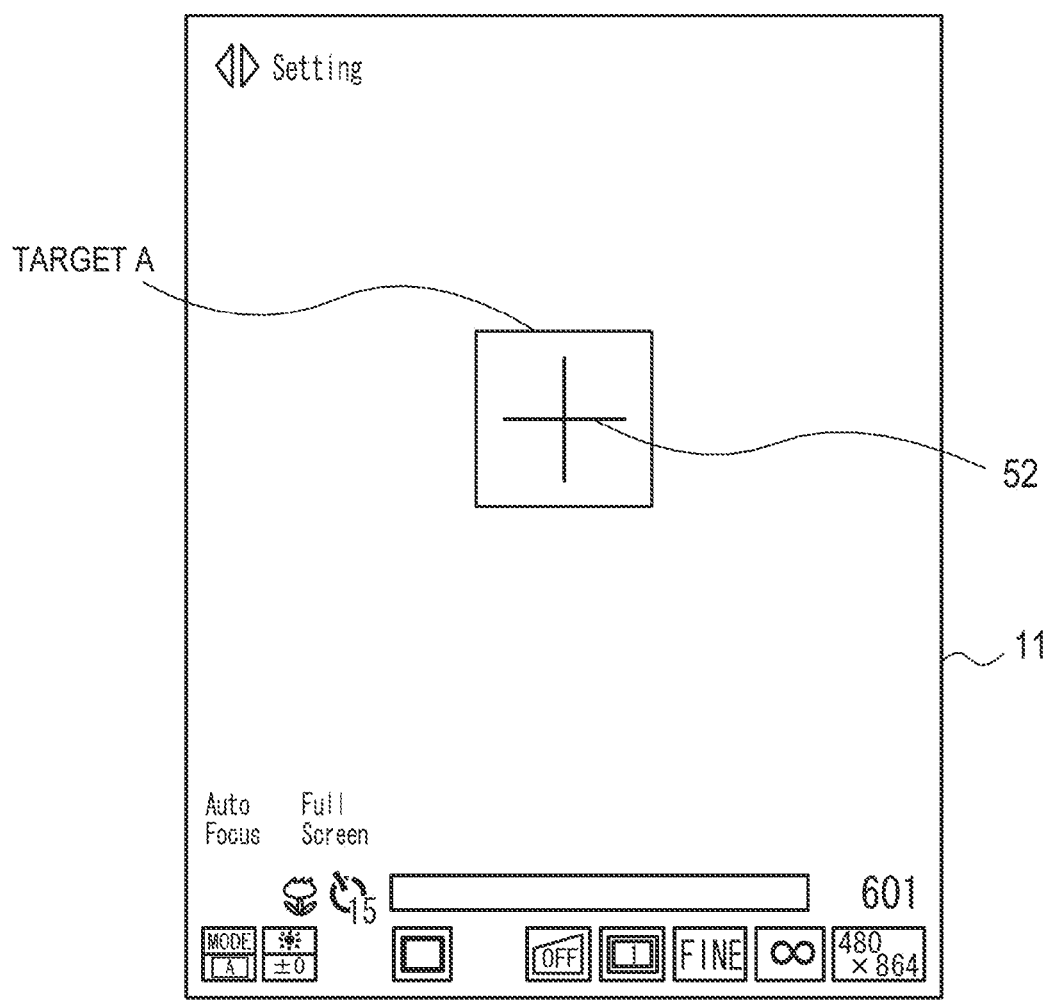
FIG. 7 is a diagram illustrating an example of finder display in a display unit.
Figure 8:
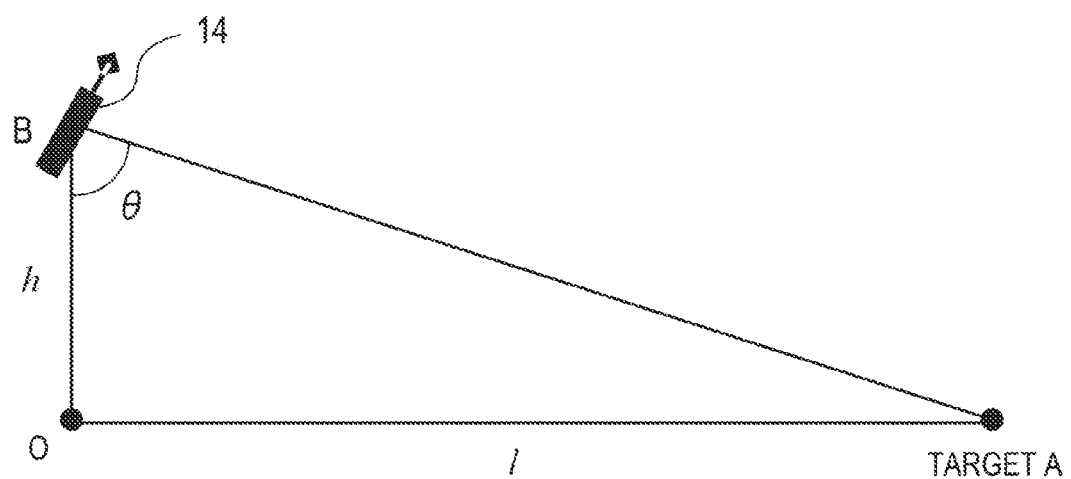
FIG. 8 is a diagram illustrating a method of distance measurement in case of the inclination angle θ.

The distance measuring processing will be described with reference to FIG. 5, FIG. 6, FIG. 7, and FIG. 8. FIG. 5 is a diagram illustrating acceleration measurement by an acceleration sensor in case where the inclination angle is zero degrees. FIG. 6 is a diagram illustrating acceleration measurement in a direction of an inclination degree θ. FIG. 7 is a diagram illustrating an example of finder display in a display. FIG. 8 is a diagram illustrating a method of distance measuring in case of the inclination degree θ.

FIG. 8 illustrates a measurement state of the gravity acceleration g in a vertical direction in case where the mobile device 14 is placed horizontally to the ground surface, which is, placed in a stationary state. As illustrated in FIG. 5, the inclination angle of the mobile device 14 in the distance measuring is zero degrees based on the state that the housing unit 38 having the acceleration sensor 3 of the mobile device 14 is parallel to the ground surface. For measurement of the gravity acceleration g in this case, the acceleration sensor 3 measures acceleration in a state that the camera 7 of the mobile device 14 is placed horizontally to the ground surface.

The measured value of the gravity acceleration g acquired at this time may be used in the distance calculation processing described below. Furthermore, for this measurement, only conforming processing of a reference point is performed, and the general value of the gravity acceleration, g=9.8 (m/s2), may be used in the distance calculation processing to be performed on an object.

FIG. 6 illustrates calculation of gravity acceleration in case where the inclination angle formed by the mobile device 14 and the ground surface is the inclination degree θ. The inclination degree θ is an angle in the state that the measuring object is displayed on the display 11, that is, the measuring object is captured. In this case, as for the gravity acceleration g in case where the inclination angle is zero degrees, the value in the inclination angle θ direction is calculated to be (g*cos θ) by using the trigonometric function. That is, this value is a gravity acceleration component corresponding to the inclination angle of the housing unit 38 in the stationary state.

When the acceleration sensor 3 measures the acceleration a out in case of the inclination angle θ in the stationary state, the value corresponds to the component of the above-described gravity acceleration angle g in the inclination angle θ direction. The acceleration is expressed by the following expression (1).

$$a\text{out} = g \ast \cos\theta \quad (1)$$

Since the gravity acceleration g is a known value, the value of the inclination angle θ is expressed by the following expression (2).

$$\theta = \cos^{-1}(a\text{out}/g) \quad (2)$$

The value of the acceleration a out measured by the acceleration sensor 3 is transmitted to the attitude measuring processor 6 (FIG. 1). Then the inclination angle θ is calculated by the above-described expression (2).

As for target indication for a target A as the measuring object, an example of finder display is illustrated. In the finder display illustrated in FIG. 7, for example, the camera 7 of the mobile device 14 is started according to an indication operation to the distance measuring mode. Indication to the camera 7 is performed by the camera processor 8 (FIG. 1) as described above. Furthermore, for this distance measurement, a measuring point 52 used to perform target indication on the measuring object, for example, at the center of the image displayed on a finder. For example, the target indication is performed by superimposing the measuring point 52 as a "+" mark on the target A displayed on the display 11. This measuring point 52 does not move from a specified position of the display 11. Thus, by superimposing the measuring point 52 on the measuring object, the mobile device 14 may be faced toward the target A. This may determine the inclination angle θ with respect to the measuring object.

Display processing of the measuring point 52 in this distance measurement is performed by the display processor 12 (FIG. 1), for example. As the measuring point 52, the "+" mark is displayed. However, the display is not limited to this mark. Any display in a shape indicating the measuring object is applicable.

For calculation of the distance to the measuring object by the calculated inclination angle θ, as illustrated in FIG. 8, if the position of a measurer is the present position O as the reference position, the position of the mobile device 14 is the position B on the vertical line from the present position O. The relation of the target A as the measuring object, the present position O, and the position B of the mobile device 14 may form a right-triangle. Therefore, this distance calculation is performed by the trigonometric function using the calculated inclination angle θ.

At this time, if the distance between the present position O and the position B is a distance h, the distance h is a height at which a user operates the mobile device 14, that is, a measuring height at which the distance measurement is performed. For example, the distance h is set to ½ or ¾ of the height x of the user. The measuring height of the user may be input when the distance is measured or may be registered in the mobile device 14 in advance. The height h may be set to ½ or ¾ of the height x of the user or may be set arbitrarily.

The calculation processing of the distance I between the present position O and the target A is performed by the distance measuring processor 10 (FIG. 1). By using the measuring height h and the inclination angle θ, the distance I is expressed by the following expression (3).

$$I = h \ast \tan\theta \quad (3)$$

Therefore, the distance I to the target A may be calculated by the expression (3) using the inclination angle θ calculated by the above-described expression (2).

Figure 9:
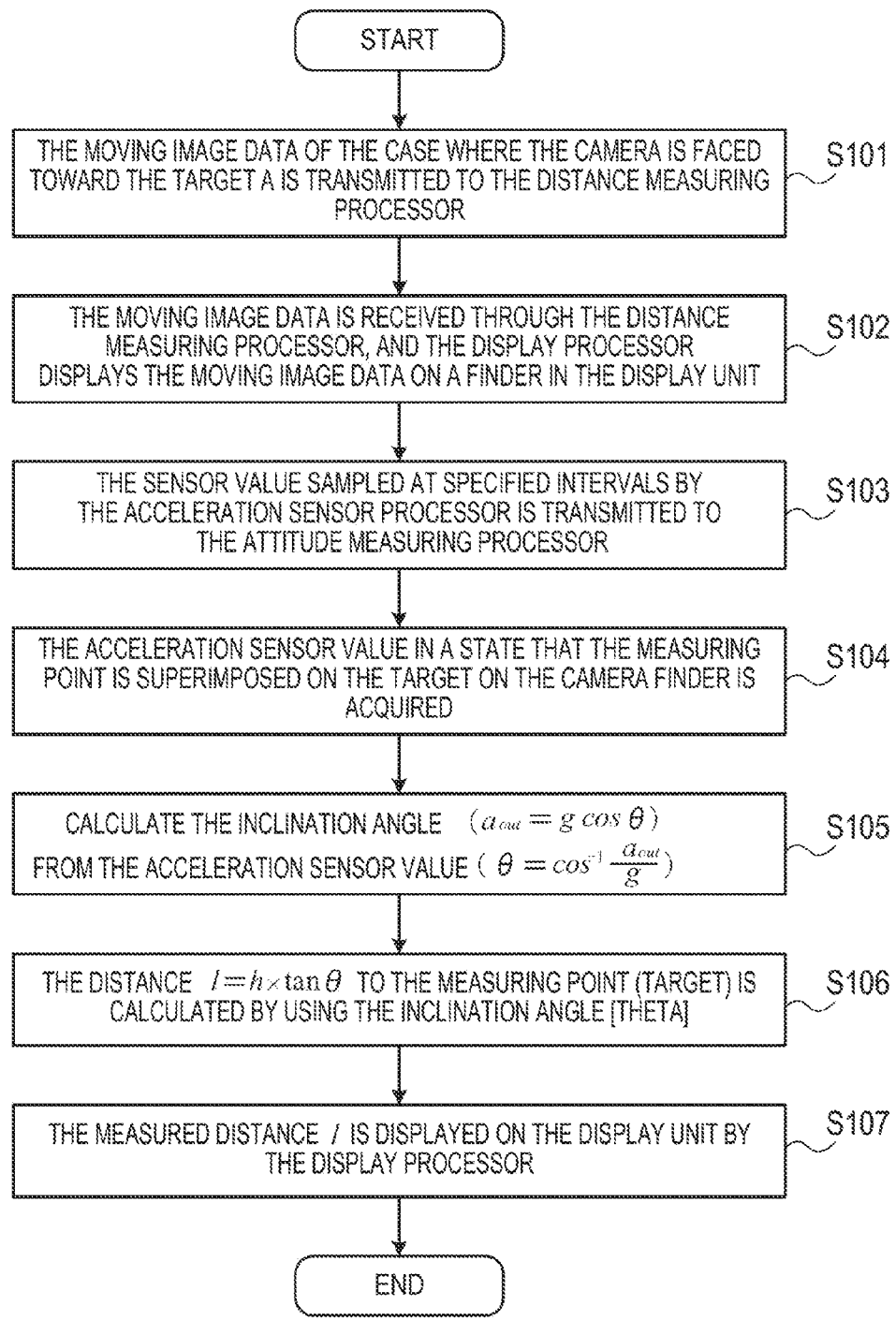
FIG. 9 is a flowchart illustrating contents of distance measuring processing.

Next, the processing content of a distance measuring method or a distance measuring program will be described with reference to FIG. 9. FIG. 9 is a flowchart illustrating the content of the distance measuring processing. The processing content and processing procedure illustrated in FIG. 9 are an example, but not limited to the example.

In this distance measurement, the image information of the target A to be measured is acquired, and the mobile device 14 as the distance measuring device is faced in such a way that a specified angle (the inclination angle θ) is formed by using the image information. Then the inclination angle θ and the distance I are calculated by using the measured value a out of the gravity acceleration in case of the inclination angle θ.

First, the mobile device 14 starts, for example, the camera 7 in a start state of the distance measuring program and the like. Then the mobile device 14 transmits, to the distance measuring processor 10, the moving image data of the case where the started camera 7 is faced toward the direction of the target A (Operation S101).

The moving image data is received by the display processor 12 through the distance measuring processor 10. The display processor 12 performs finder display processing on the moving image data and displays the moving image data on the display 11 of the mobile device 14 (Operation S102). In this display processing, the measuring point 52 is also displayed.

The acceleration sensor processor 4 samples the measured value a out measured by the acceleration sensor 3 at specified intervals and transmits the measured value a out to the attitude measuring processor 6 (Operation S103). In this manner, the acceleration a out is measured at the specified intervals. Thus, change of the distance I in each specified timing may be measured when the target A is moving. If the measuring interval is shortened, the distance measurement may be performed according to movement of the mobile device 14 for target indication.

On the camera finder (the display 11), in a state that the measuring point 52 is superimposed (overlapped) on the target A, the measured value a out measured by the acceleration sensor 3 (Operation S104) is acquired.

The measured acceleration a out is used to calculate the inclination angle θ by the above-described expressions (1) and (2) (Operation S105). By using this acceleration angle θ, the distance I to the target A (the measuring point) is calculated (Operation S106). The above-described expression (3) is used to calculate the distance I. As the measuring height h used to calculate the distance I, the height x of the user of the mobile device 14, a measurer, is used as described above. The height x may be registered in the mobile device 14 in advance or may be input when the distance measuring mode is started.

Then the measured value of the distance I is displayed on the display 11 (Operation S107).

Figure 10:
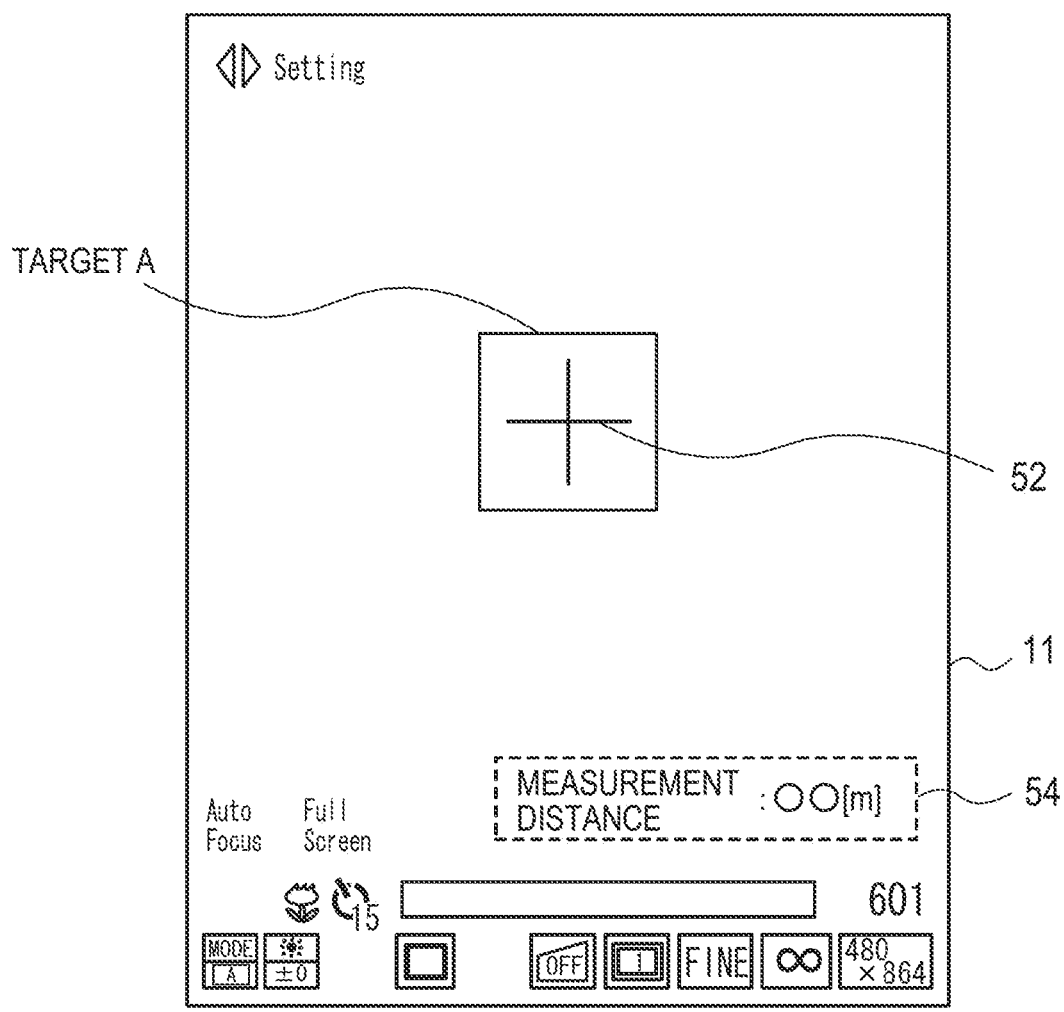
FIG. 10 is a diagram illustrating an example of the display unit performing distance display.

Next, distance display on the display will be described with reference to FIG. 10. FIG. 10 is a diagram illustrating an example of the display performing distance display.

In this display processing, a part of the finder display of the mobile device 14 illustrated in FIG. 7 includes a distance display 54 that displays a distance to the target A that is currently displayed. The distance display 54 displays the distance calculated by the above-described distance calculation measurement as "measurement distance: OO [m]," for example. The distance display is updated according to a sampling interval of acceleration in the acceleration sensor 3.

In FIG. 10, even though the distance is displayed inside the finder display of the display 11, the display is not limited to the finder display. For example, the display may be switched to the display screen indicating results of the calculation processing. The mode of the display on the display 11 may be arbitrarily switched by a user of the mobile device 14.

This configuration enables the configuration for distance measurement to be simplified and prevents a size of the mobile device from being enlarged when the distance measuring function is mounted on the mobile device. Furthermore, the distance measuring processing is simplified by using the acceleration sensor mounted on the mobile device. This may reduce the processing load on a processor mounted on the mobile device and may display the measurement results in a short time.

Second Embodiment

Figure 11:
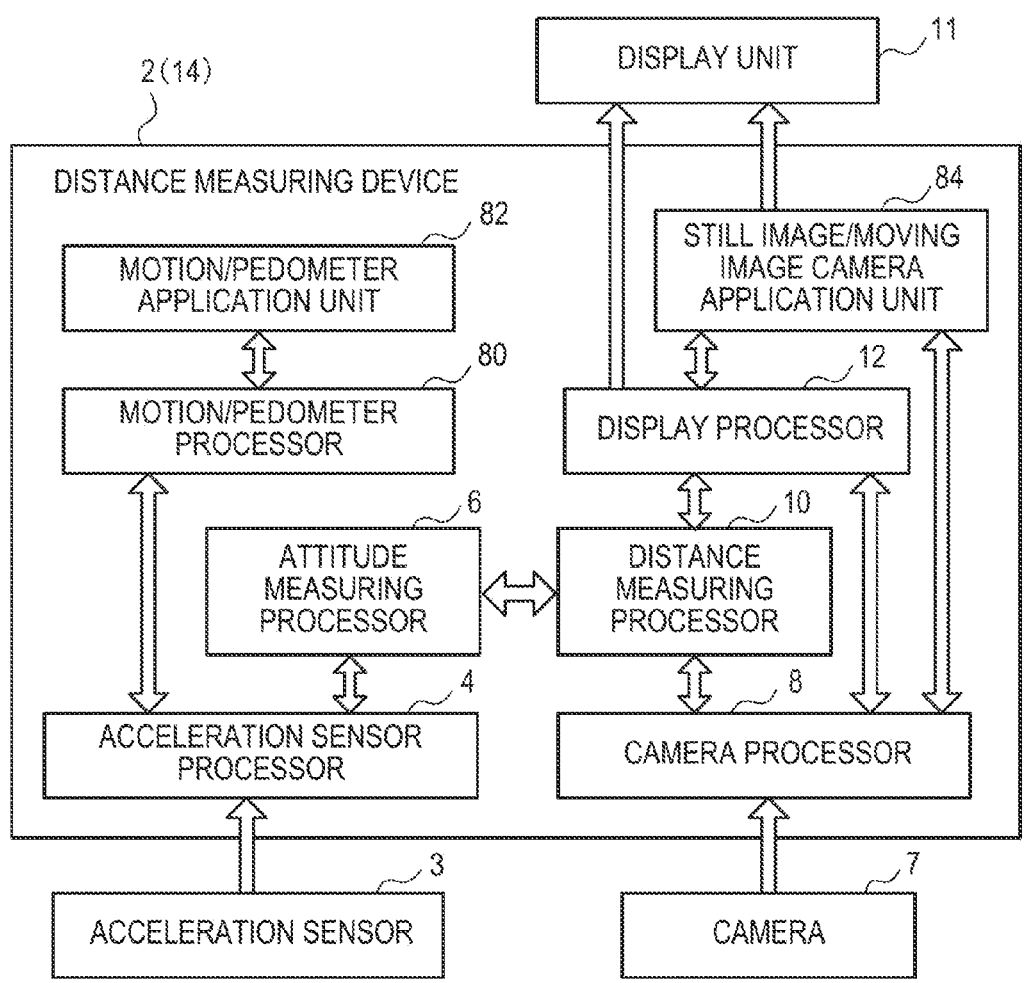
FIG. 11 is a functional block diagram of a distance measuring device according to a second embodiment.

The distance measurement according to the second embodiment will be described with reference to FIG. 11. FIG. 11 is a functional block of the distance measuring device according to the second embodiment. In FIG. 11, the same numerals are used for the same configuration as in FIG. 1, and the description is omitted. The configuration illustrated in FIG. 11 is an example, but not limited to this example.

In the present embodiment, as for the distance measurement, description will be made of the distance measuring device 2 that functions in relation to various application functions mounted on the mobile device 14. As illustrated in FIG. 11, the mobile device 14 having the distance measuring device 2 includes a motion/pedometer processor 80, a motion/pedometer application unit 82, a still image/moving image camera application unit 84 as well as the acceleration sensor processor 4, the attitude measuring processor 6, the camera processor 8, the distance measuring processor 10, and the display processor 12.

As described above, the acceleration sensor processor 4 notifies the attitude measuring processor 6 of the measured value measured by the acceleration sensor 3, receives a notification of a sampling mode as setting information of the acceleration sensor 3 from the motion/pedometer processor 80, and notifies the motion/pedometer processor 80 of the value measured by the acceleration sensor 3 according to the sampling mode. The sampling mode is a setting value of acceleration detecting processing set to the acceleration sensor 3 and includes, for example, an attitude detection mode set to perform the distance measurement, a motion/pedometer mode set to be used for motion function or pedometer function. For each of the above-described modes, detection timing by the acceleration sensor 3, an acceleration threshold value, a threshold value excess consecutive time, a sampling interval time, and the like are set, respectively. The acceleration sensor processor 4 is composed of, for example, a control program for controlling the acceleration sensor 3 and the RAM 22 (FIG. 2).

The camera processor 8 receives a request of a camera operation mode from a still image/moving image camera application unit 84 or the display processor 12. The camera processor 8 operates a camera according to a setting value of, for example, frame rate (fps), auto white balance (AWB), automatic luminance adjustment (AE), a data acquisition format, and the like. Setting of the camera operation mode is performed according to an application function to be started. For example, in case of a distance calculation application, as described above, the measuring point 52 is set to be displayed to indicate the measuring object on the display 11. In case of the still image/moving image camera application 36 (FIG. 2), setting for imaging is performed.

The display processor 12 notifies the camera processor 8 of the camera operation mode, receives the image data according to the mode setting and displays the image data. The display processor 12 is composed of the display 11 of the mobile device 14. In this case, for example, in case of the distance calculation application, in the mode setting with respect to the camera processor 8, by notification of the setting of measurement finder display, the display processor 12 receives the image information captured by the camera 7 and displays the image information on a finder in the display 11. As for the result of the distance calculation processing, the measured value notified from the distance measuring processor is displayed.

The attitude measuring processor 6 and the distance measuring processor 10 have the same configuration and perform the same process as in the first embodiment.

The motion/pedometer application unit 82 is composed of, for example, the pedometer application 34 stored in the program storage unit 18 and the RAM 22 (FIG. 2). This processing content notifies the motion/pedometer processor 80 of the sampling mode of the acceleration sensor 3. The motion/pedometer application unit 82 receives the processing result from the motion/pedometer processor 80 and notifies the user of the processing result. In this case, for example, the motion application acquires the measured value of the acceleration at 2 to 100 [ms] interval, for example, from the acceleration sensor 3 and monitors a change of the acceleration. By determining whether or not the change of the acceleration is greater than the specified threshold value, the motion application analyses states such as "tapping on the housing units 38 and 40 of the mobile device 14," "shaking the mobile device 14," "attitude of the mobile device 14," or the like. When the above-described operations are detected, processes such as "switch reception sound to silent mode," "stop alarm sound," "illuminate back light of sub-liquid crystal," and the like are performed.

In the mode of the pedometer application, the change of the acceleration acquired at intervals of, for example, 2 to 40 [ms] from the acceleration sensor 3 is analyzed by the processing program to determine whether or not the change has energy enough for one step. If the energy is enough, the steps are counted. Then processing for displaying the step information on the display 11 and the like are performed.

The motion/pedometer processor 80 is, for example, middleware that operates a program stored in the program storage unit 18 (FIG. 2) and functions by starting the program in the RAM 22. The processing content of the motion/pedometer processor 80 notifies the acceleration sensor processor 4 of the sampling mode. Then the motion/pedometer processor 80 receives a detection result of the acceleration sensor 3 according to the sampling mode from the acceleration sensor processor 4.

The motion/pedometer processor 80 is configured to perform motion detection processing on the measured value of the received acceleration and notifies the motion/pedometer application unit 82 of the measured value.

The still image/moving image camera application unit 84 is composed of, for example, the still image/moving image camera application 36 stored in the program storage unit 18 (FIG. 2) and the RAM 22. The still image/moving image camera application unit 84 notifies the camera processor 8 of the camera operation mode such as the still image mode or the moving mode, and receives the image data acquired by this operation mode to perform processing or displaying the image data in a specified format and the like. The still image/moving image camera application unit 84 further performs storing processing of image data and control of a shutter and the like.

Next, start processing of the distance measuring function will be described with reference to FIG. 12 and FIG. 13. FIG. 12 is a flowchart illustrating start determination processing of the distance measuring function. FIG. 13 is a flowchart related to application start processing of a mobile device. The processing content and procedure illustrated in FIG. 12 and FIG. 13 are an example, but not limited to the example. The processing illustrated in FIG. 13 is an example illustrating a part of the processing performed by using the camera 7 or the acceleration sensor 3 among from the applications provided on the mobile device 14.

The distance measuring function is performed when operation for selecting the distance measuring in a menu application or a standby application of the mobile device 14 or when the distance measuring mode is selected when the camera application is being operated.

The mobile device 14 determines whether or not the start operation of the distance measuring function is performed. The mobile device 14 determines whether or not the user selects the distance measurement from the menu application (Operation S201). If the start operation is not performed (No in Operation S201), the mobile device 14 determines whether or not a specific key, which is set to start the distance measuring function of the mobile device 14 from the standby application, is pressed for a long time (Operation S202). The specific key includes, for example, a shortcut key and the like to which the user sets the operation of the distance measuring function. According to the setting, the operation by the specific key is not limited only to long-time press but also regular press.

If the specific key is not pressed (No in Operation S202), the mobile device 14 determines whether or not the distance measuring function set to the sub menu is selected when the application using the camera function is being operated (Operation S203). For example, when an imaging function is used in the mobile device 14, the display 11 displaying an imaging object is configured to display a distance to the imaging object. Since the camera 7 is faced toward the measuring object, the above-described distance measuring processing may be used at the same time.

According to the above-described determination, when the start operation of the distance measuring function is performed (Yes in Operation S201, Yes in Operation S202, Yes in Operation S203), the distance measuring mode is set as a camera operation mode in the camera processor 8 and the acceleration sensor processor 4. The sampling mode of the acceleration sensor value is set to the attitude detection mode (Operation S204) to perform the distance measurement.

When the distance measurement in the camera application is not selected (No in Operation S203), the process goes back to Operation S201, and the determination processing is performed repeatedly.

This determination processing may include a case where there is an application working with the distance measuring function other than the camera application. Even when an application that is not related to the distance measuring function is being operated, for example, priority order is set to monitor whether or not there is the start operation of the distance measuring function, and the process may go to the distance measuring processing.

Next, processing in case of starting an application using the camera 7 or the acceleration sensor 3 will be described with reference to FIG. 13 and FIG. 14.

This processing indicates the processing content of the distance measuring method and the distance measuring program and indicates the start processing in case where there is an application program operated by using the camera 7 or the acceleration sensor 3 other than the application program for the distance measurement in the mobile device 14 mounting multiple functions. That is, the mobile device 14 has a configuration in which other applications using the camera 7 or the acceleration sensor 3 are not performed when the distance measuring processing is performed.

First, as described in FIG. 13, determination of the started application is performed (Operation S301). In this case, as a start application, determination is performed to determine which application is operating among from the distance calculation application for performing the distance calculation application for performing the distance display processing on the display 11, the motion/pedometer application operating by using the acceleration sensor 3, or the still image/moving image camera application operating by using the camera function. This determination is performed by a determination processing function included in each of the application programs.

If the start application is the display processing (the distance calculation application), the distance measuring mode is set to the camera 7, and the sampling mode of the acceleration sensor 3 is set to the attitude detection mode (Operation S302). Then the camera processor 8 receives a request of the camera operation mode from the display processor 12 and operates the camera 7 according to the setting value of frame rate (fps), auto white balance (AWB), automatic exposure (AE), data acquisition format, and the like, for example, as the value set in advance according to the operation mode (Operation S303).

As for the determination in Operation S301, if the start application is the still image/moving image camera application, the still image mode or the moving image mode is set to the camera 7. In this case, since the acceleration sensor 3 of the mobile device 14 is not used, the setting of sampling mode is not performed (Operation S304). The process goes to Operation S303. As described above, the camera processor 8 receives a request of the camera operating mode from the still image/moving camera application unit 84 and operates the camera 7 according to the specified set value.

The camera processor 8 determines whether or not the start application is the display processing or the still image/moving image camera application (Operation S305). The determination is performed according to, for example, the operating mode of the camera 7 set in Operation S303, respectively.

If the start application is the display processing, the camera processor 8 notifies the distance measuring processor 10 of the moving image data of case where the camera 7 is faced toward the target A (Operation S306). As described in FIG. 14, the display processor 12 receives the acquired moving image data from the distance measuring processor 10 and displays the moving image data on the display 11 (Operation S307).

According to the determination of Operation S305, if the started application is the still image/moving image camera application, the determination processing of this start application is finished.

Next, the process goes to the setting and the measuring processing of the acceleration sensor 3. The setting of the sampling mode with respect to the acceleration sensor processor 4 is determined (Operation S308). In the display processing, the attitude detection mode is set in Operation S302.

In case of the attitude detection mode, the setting of the attitude detection mode is performed with respect to the acceleration sensor 3 from the acceleration sensor processor 4 (Operation S309). In this setting, for example, the interval of the sampling in the acceleration sensor 3 and the like are set.

After the setting with respect to the acceleration sensor 3 is performed, the acceleration measuring processing, the calculation processing of the inclination angle θ in the attitude measuring processor 6, the distance calculation processing in the distance measuring processor 10 are performed, and the measurement distance is displayed on the display 11. Since the processing of Operation S310 to Operation S314 is the same as in Operation S101 to Operation S107 (FIG. 9), the detailed description is omitted.

Based on the determination in Operation S301 illustrated in FIG. 13, when the motion/pedometer application is operating, the camera operation mode is not set because the camera 7 is not used, and the sampling mode of the acceleration sensor 3 is set to the motion/pedometer mode (Operation S315).

After the sampling mode is set, the process goes to the process by the acceleration sensor 3. In Operation S308, determination of the sampling mode is performed. The setting of the motion/pedometer mode is notified to the acceleration sensor 3 from the acceleration sensor processor 4 (Operation S316). In this case, the setting of the sampling interval and the like with respect to the acceleration sensor 3 is performed.

The acceleration sensor 3 samples the acceleration at the set intervals and notifies the motion/pedometer processor 80 of the measurement result (Operation S317). According to the notified measurement result, the motion/pedometer processor 80 performs the motion detection processing or step count processing and notifies the motion/pedometer application unit 82 of the processing result (Operation S318). In the application using the operating motion function and the pedometer application, the processing result is notified to the user (Operation S319).

The mobile device has multiple applications and does not start the applications using a camera or an acceleration sensor at the same time to prevent the processing of the camera or the acceleration sensor from competing. Accordingly, the load on the processer and the like mounted on the mobile device may be reduced, and the speed of the distance measuring processing may be improved.

Another Embodiment (1) In the above-described embodiment, a mobile phone is given as an example of the mobile device 14 mounted with the distance measuring device 2, but not limited to a mobile phone. However, for example, a Personal Digital Assistant (PDA) or a Portable Personal Computer with the camera 7 and the acceleration sensor 3 is applicable.

(2) According to the above-described embodiment, as illustrated in FIG. 13 and FIG. 14, if the started application is the still image/moving image camera application, the display processing as the distance calculation application is not performed. However, as described in Operation S203 in FIG. 1, for example, the distance calculation processing of the distance measuring processing may be performed as a sub menu when the still image/moving image camera application is being started. In this case, the distance display to the object captured by the display 11 that performs imaging a still image or a moving image may be performed.

According to the embodiments of the present invention, the following advantages are achieved.

(1) Simplifying a configuration for distance measurement may prevent an increase in size of a mobile device when the configuration is mounted on the mobile device.

(2) Distance measuring processing is not complicated, so that the processing load to a CPU mounted on the mobile device may be reduced and measurement results may be displayed in a short time.

(3) Distance measurement may be performed only by an operation for measuring gravity acceleration according to an inclination angle of the mobile device with respect to a measuring object, which does not require complicated operations for calculating processing.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A distance measuring device comprising:
   a display processor that acquires an image which includes a distance measuring object from a camera, and generates display information indicating the image;
   an acceleration sensor that is provided with a device housing having the display processor and outputs a gravity acceleration component corresponding to an inclination angle of the device housing; and
   a distance measuring processor that calculates an inclination angle from the gravity acceleration component that is obtained from the acceleration sensor in a state that an image indicating the measuring object is captured in the display information generated by the display processor, and calculates a distance between the device housing and the measuring object on the basis of the inclination angle.

2. The distance measuring device according to claim 1, wherein the distance measuring processor uses a height of a position at which the gravity acceleration component is measured with the inclination angle for calculation of a distance to the measuring object.

3. The distance measuring device according to claim 2, the height is set based on a height of a measurer.

4. The distance measuring device according to claim 1, wherein the display processor generates measuring point information indicating the measuring object in the display information in the display information indicating the image that includes the measuring object.

5. The distance measuring device according to claim 1, wherein the display processor generates distance display information based on a calculation result of the distance from the distance measuring processor.

6. The distance measuring device according to claim 1, wherein the camera is a digital camera or a digital video camera built into the device housing.

7. The distance measuring device according to claim 1, wherein the distance measuring device is a mobile device.

8. A distance measuring method comprising:
   acquiring an image that includes a distance measuring object from a camera and generating display information indicating the image;
   acquiring a gravity acceleration component corresponding to an inclination angle of a device housing from an acceleration sensor provided in the device housing;
   calculating an inclination angle from the gravity acceleration component obtained from the acceleration sensor in a state that an image indicating the measuring object captured into the display information; and
   calculating a distance between the device housing and the measuring object on the basis of the inclination angle.

9. The distance measuring method according to claim 8, wherein the distance measuring method uses a height of a position at which the gravity acceleration component and the inclination angle are measured to calculate a distance to the measuring object.

10. The distance measuring method according to claim 8, further comprising: generating distance display information based on a calculation result of a distance.

11. A non-transitory computer-readable recording medium storing a program, the program causing the computer to execute:
    acquiring an image that includes a distance measuring object from a camera and generating display information indicating the image;
    acquiring a gravity acceleration component corresponding to an inclination angle of a device housing from an acceleration sensor provided in the device housing; and
    calculating an inclination angle from the gravity acceleration component obtained from the acceleration sensor in a state that an image indicating the measuring object is captured into the display information, and calculating a distance from the device housing to the measuring object based on the inclination angle.

12. The non-transitory computer-readable recording medium according to claim 11, wherein the computer-readable recording medium records the distance measuring program by using the inclination angle and a height of a position at which the gravity acceleration component and the inclination angle are measured to calculate a distance to the measuring object.

13. The non-transitory computer-readable recording medium according to claim 11, the program further causing the computer to execute: generating distance display information based on a calculation result of a distance.

* * * * *